United States Patent

[11] 3,543,677

[72] Inventor Cornelis van der Lely
　　　　　　7, Brueschenrain, Zug, Switzerland
[21] Appl. No. 712,774
[22] Filed March 13, 1968
[45] Patented Dec. 1, 1970
[32] Priority March 28, 1967
[33] 　　　　　Netherlands
[31] 　　　　　No. 6704384

[54] CROP STORES AND SILOS
　　　18 Claims, 15 Drawing Figs.
[52] U.S. Cl. .................................................. 100/66,
　　　　　　　　　　　　　　　　　　　　　　100/211, 214/17
[51] Int. Cl. ................................................. B65g 3/10,
　　　　　　　　　　　　　　　　　　　　　　B65g 65/46
[50] Field of Search ........................................ 214/17.6,
　　　17.64, 17.8; 100/65, 66, 211; 141/73; 53/124(B);
　　　　　　　　　　　　　　　　　　　　　　220/5, 5(A)

[56] 　　　　　　　　　References Cited
　　　　　　　　UNITED STATES PATENTS
3,190,468　6/1965　Kocher ........................ 214/17(.82)UX
3,338,435　8/1967　Rey .............................. 214/17(.6)UX
1,859,632　5/1932　Pheteplace .................... 220/5(A)X
3,209,680　10/1965　McGinnis ..................... 100/211
3,248,001　4/1966　McGinnis ..................... 100/211X
3,396,762　8/1968　Paton ............................ 100/211X
　　　　　　　　　FOREIGN PATENTS
1,369,759　7/1964　France ......................... 100/211

Primary Examiner—Robert G. Sheridan
Attorney—Mason, Mason & Albright

ABSTRACT: A crop store with an airtight flexible member which can be biased to compress crop under fluid pressure. A crop feed mechanism at the bottom of the store urges crop in the crop store and a dispensing mechanism moves crop towards an outlet.

INVENTOR
CORNELIS VAN DER LELY
BY
Mason, Mason & Albright
Attorneys

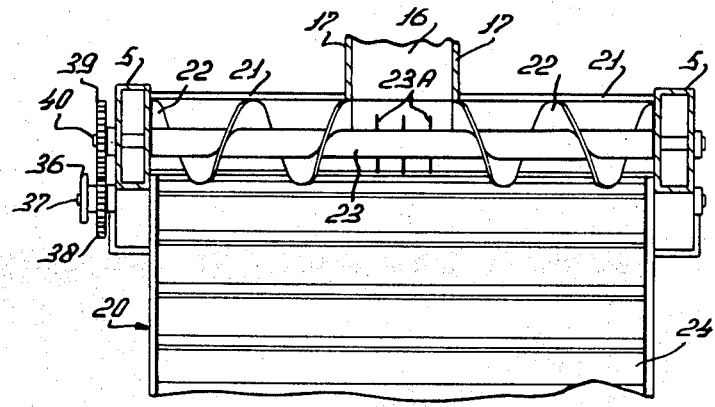
FIG. 2
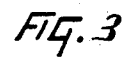
FIG. 3
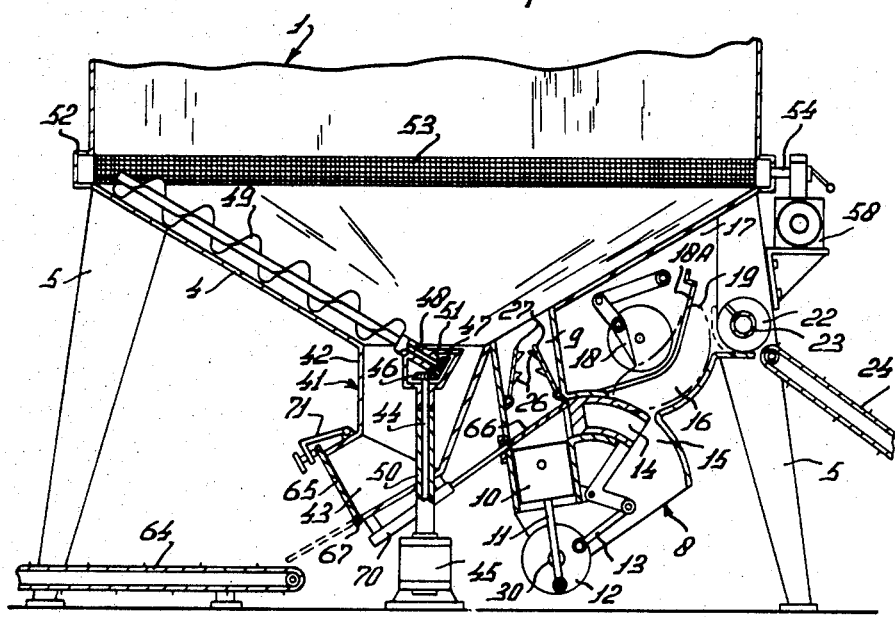
INVENTOR
CORNELIS VAN DER LELY
BY
Mason, Mason & Albright
Attorneys

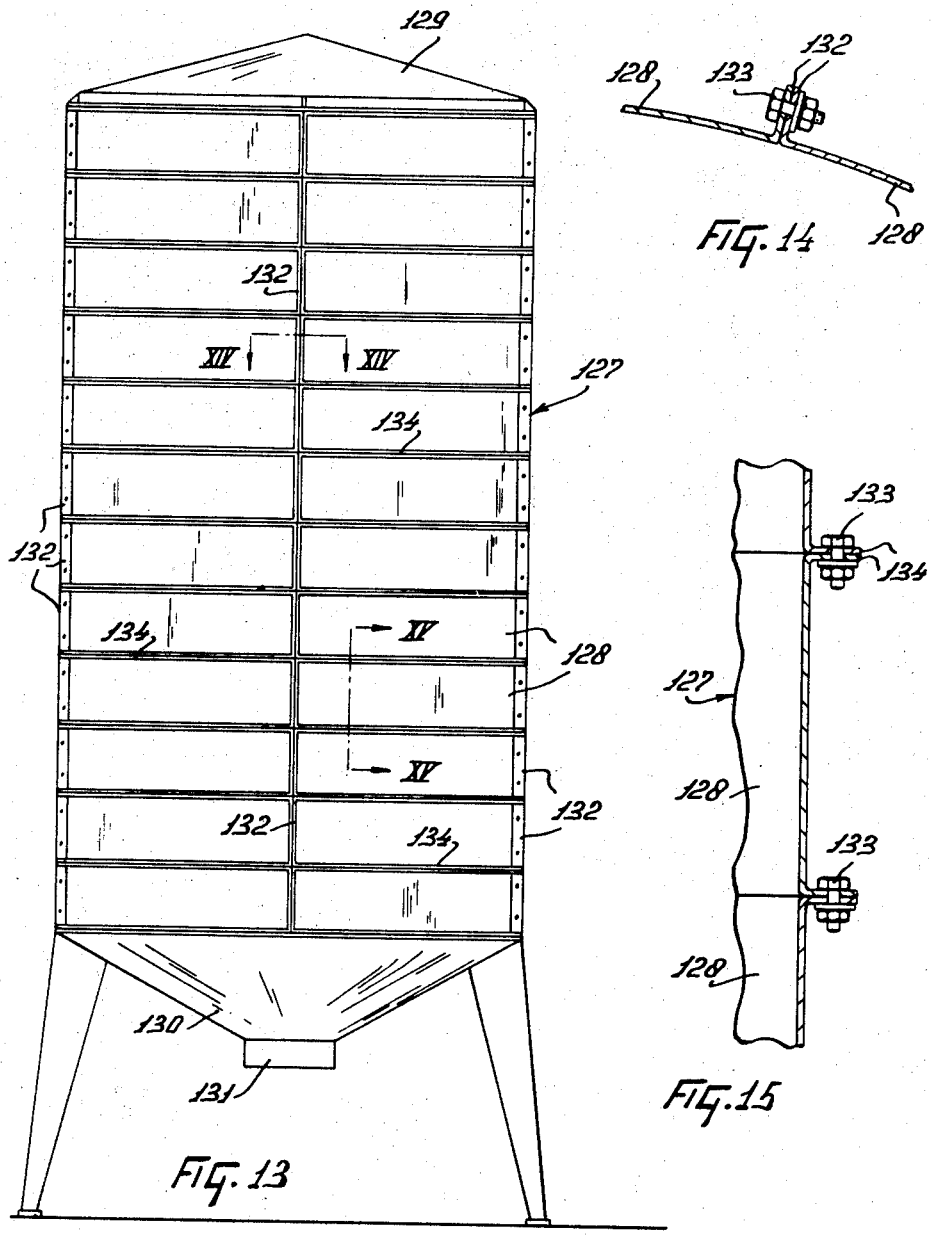

CROP STORES AND SILOS

This invention relates to crop stores and silos. An object of the invention is the provision of a crop store or silo in which fermentation of the stored crop to the required extent can be facilitated.

According to the invention, there is provided a crop store or silo provided with means to enable air to be with withdrawn from a lower region thereof.

Figure 1:
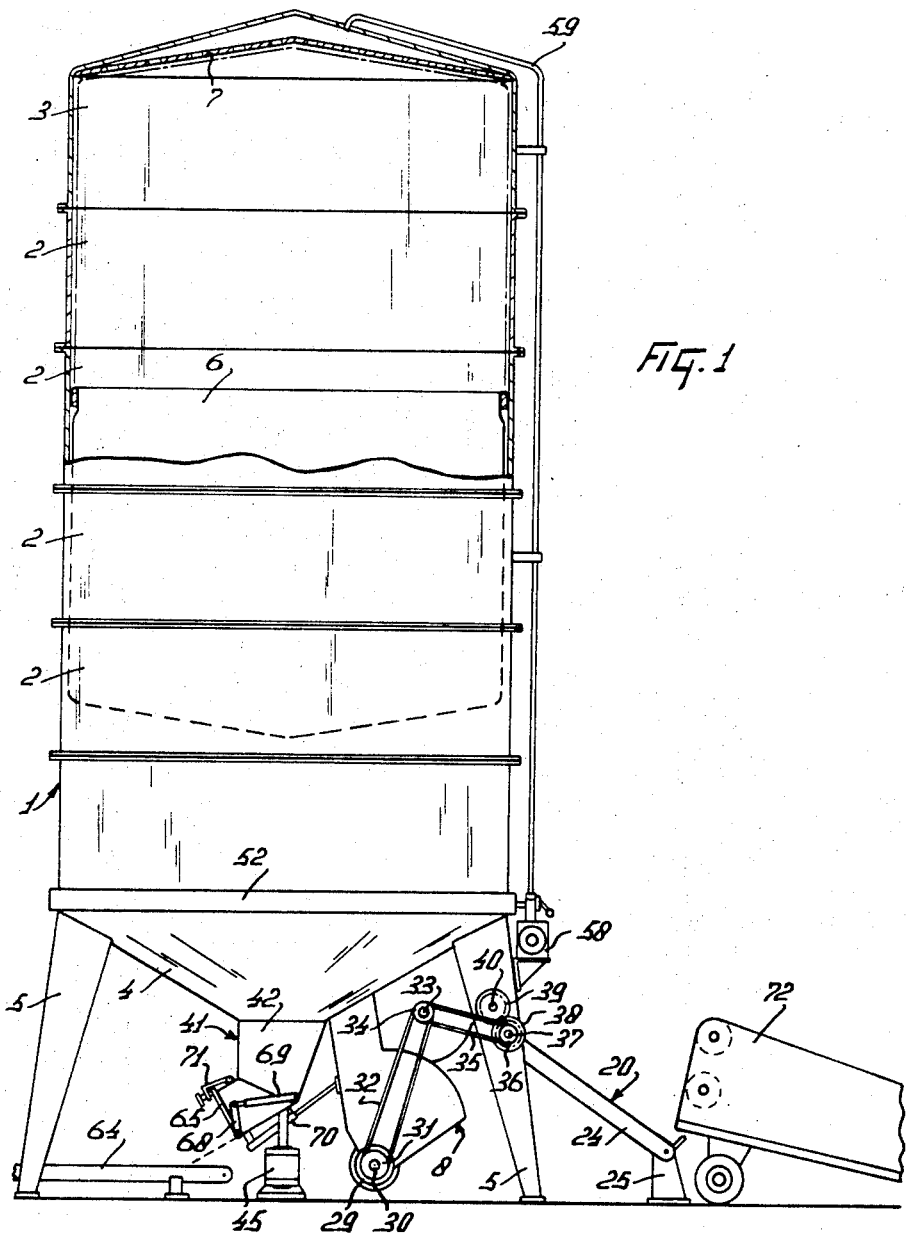
Figure 4:
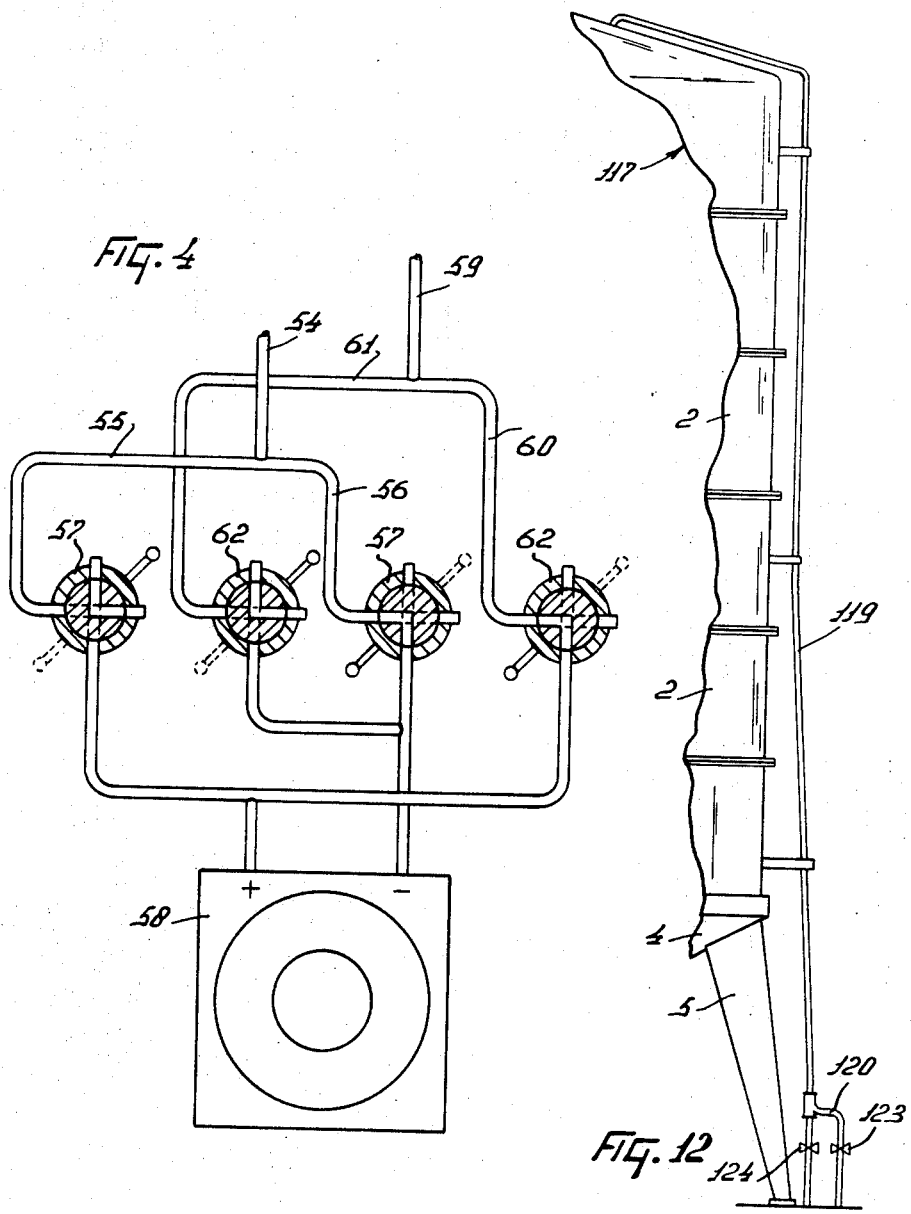
Figure 5:
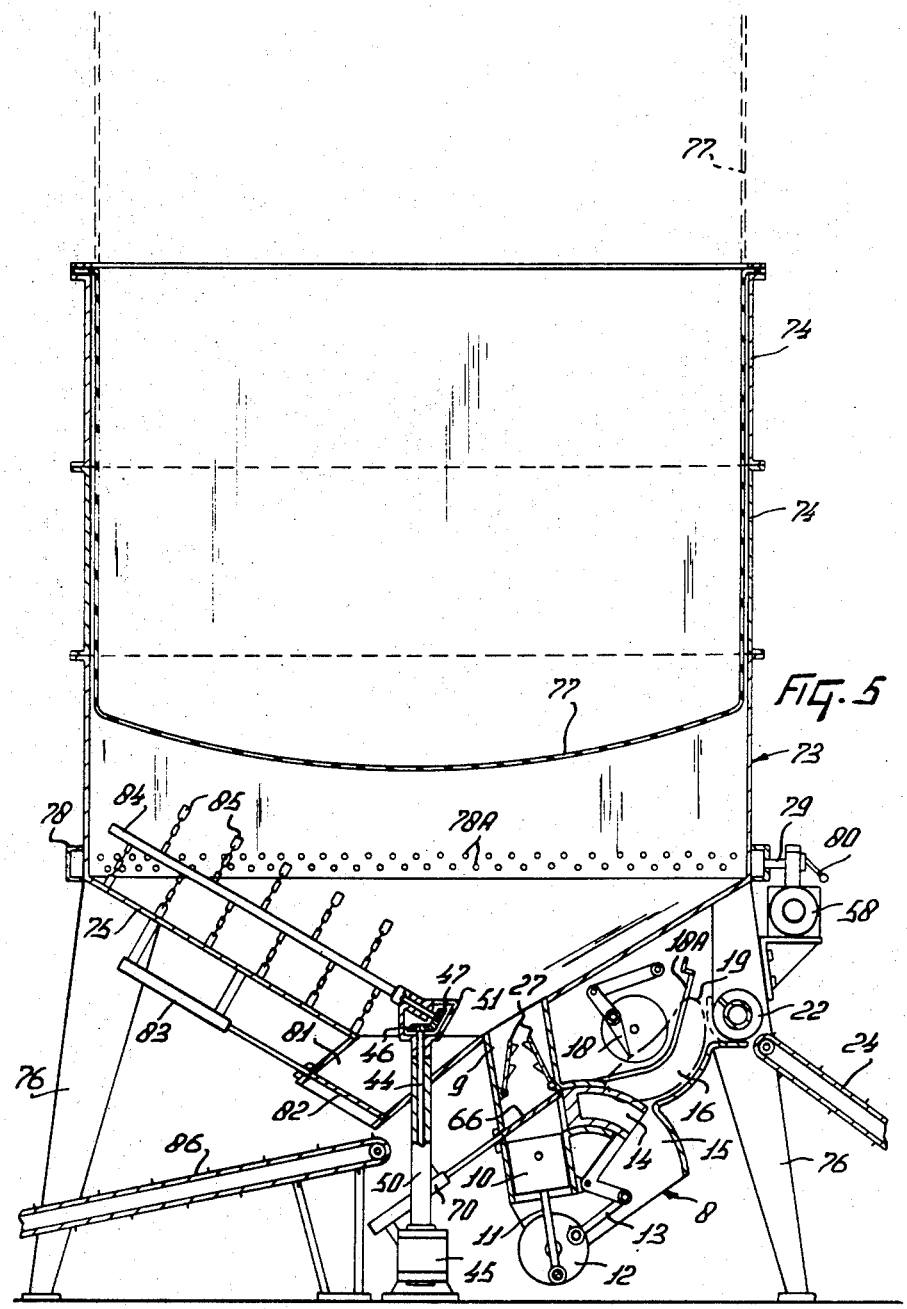
Figure 6:
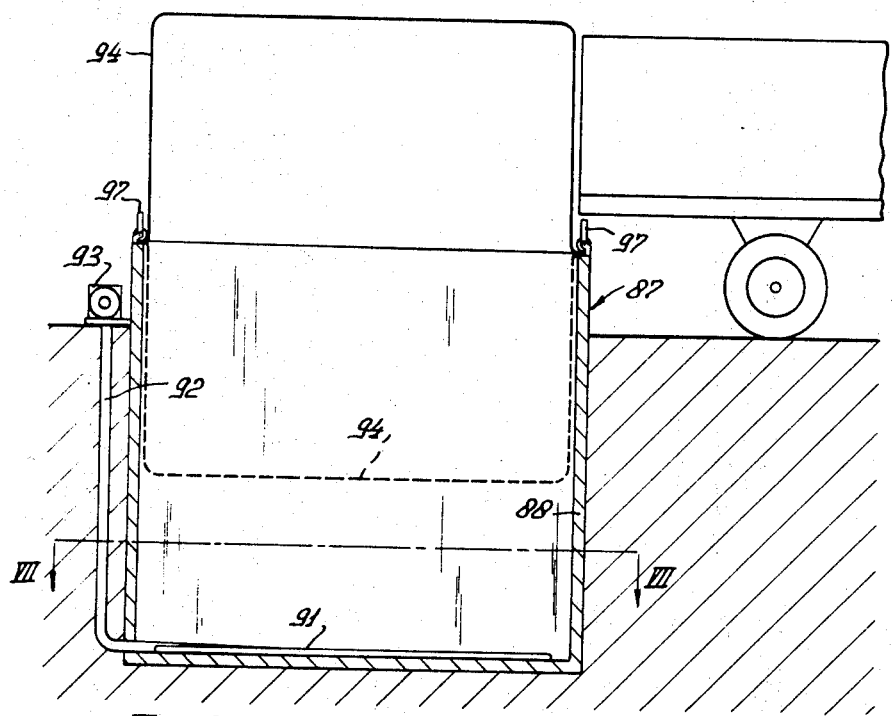
Figure 7:
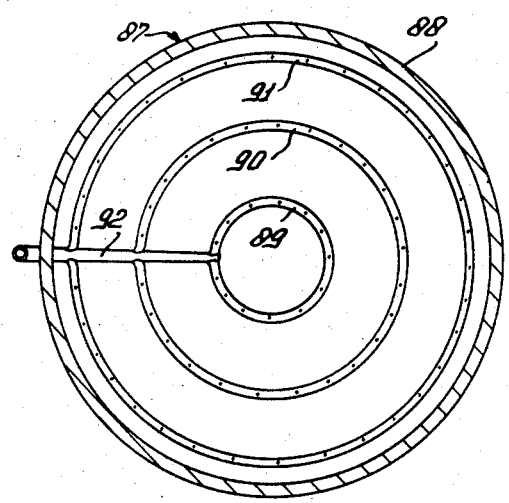
Figure 8:
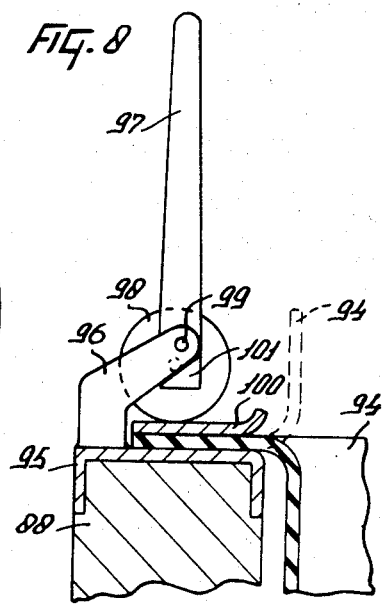
Figure 9:
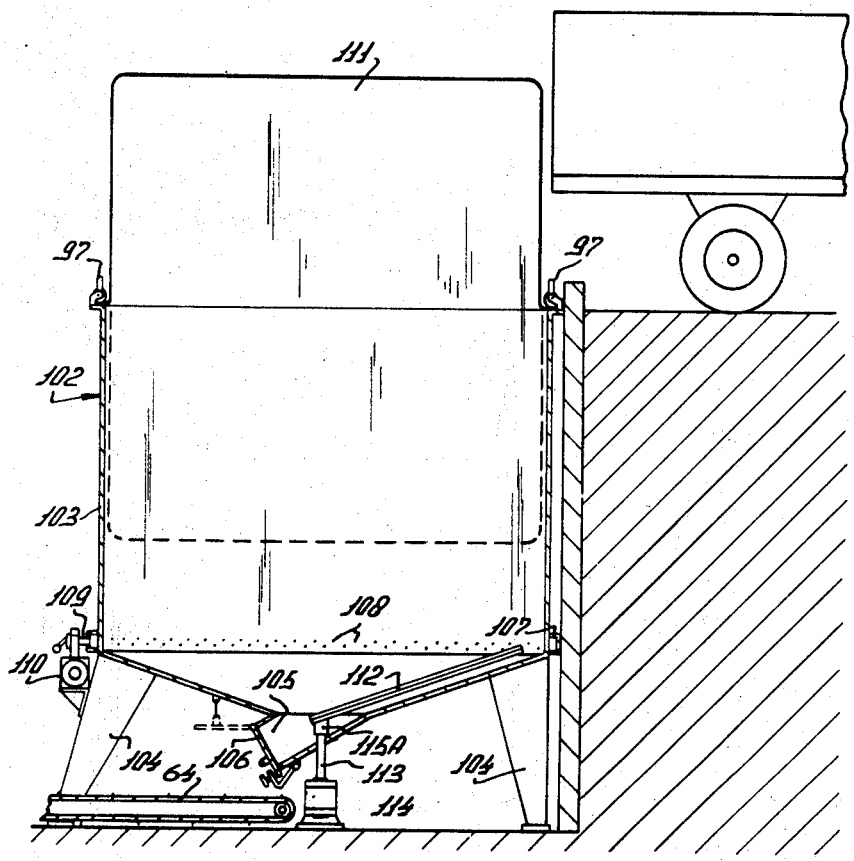
Figure 10:
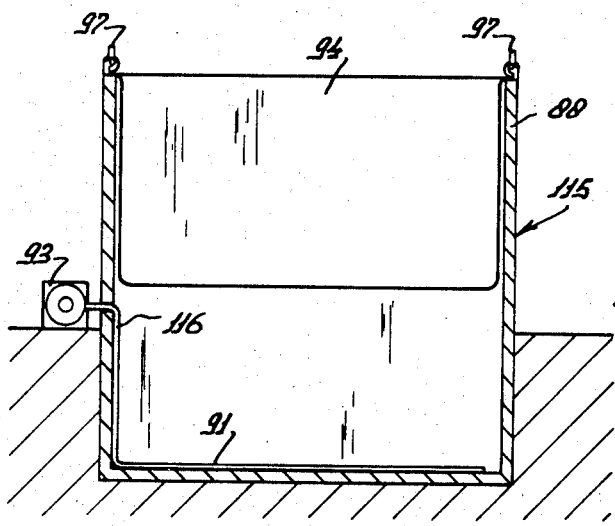
Figure 11:
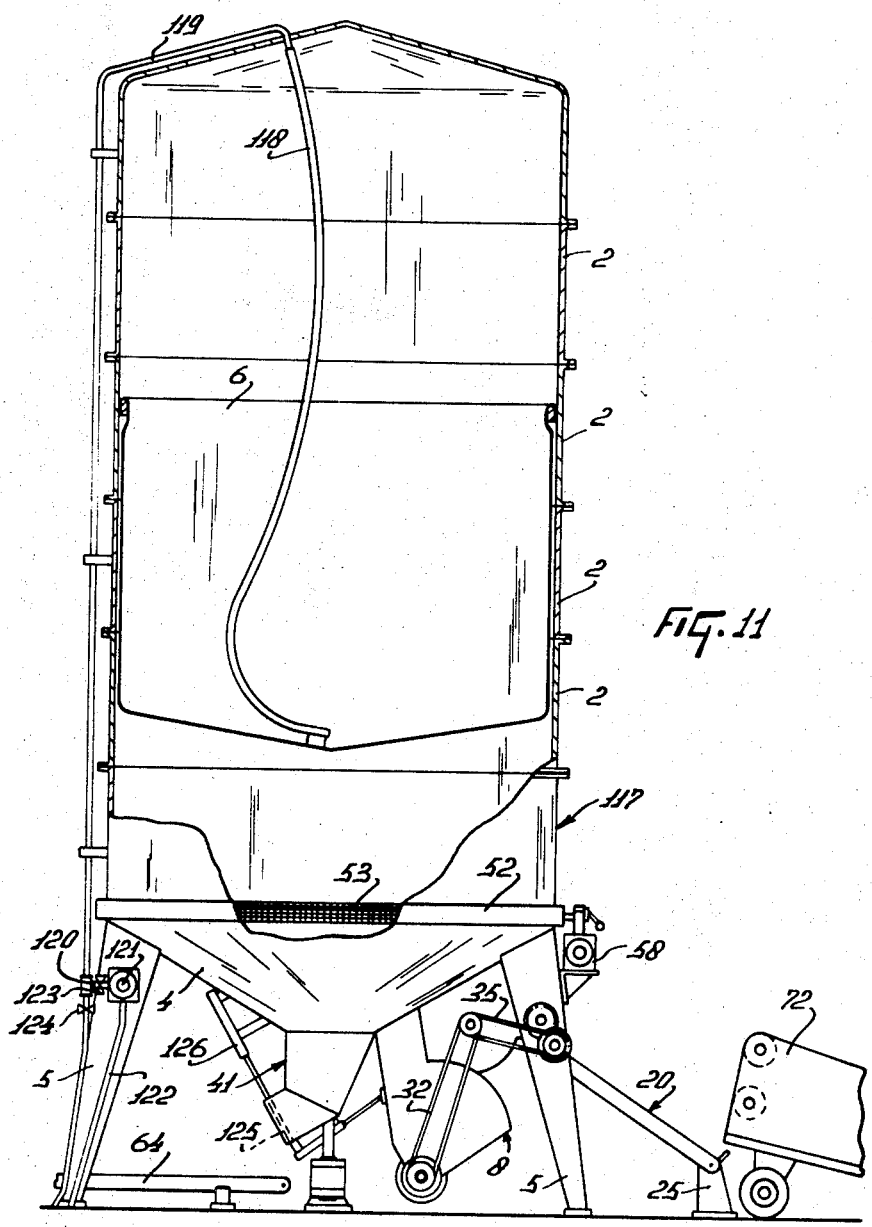

For a better understanding of the invention, and to show how the same may be carried into effect, reference will now be made, by way of example, to the accompanying drawings, in which:

FIG. 1 is an elevation of a crop store or silo in accordance with the invention, an upper region thereof being shown in section, FIG. 2 is a sectional plan view, to an enlarged scale, of a lower region of the crop store of FIG. 1, FIG. 3 is a sectional elevation, to an enlarged scale, showing a lower region of the crop store of FIG. 1 in greater detail, FIG. 4 is a diagrammatic view of the controls of a pneumatic system forming part of the crop store or silo of FIGS. 1 to 3, FIG. 5 corresponds to FIG. 3 but shows an alternative construction, FIG. 6 shows a further alternative construction of a crop store or silo in accordance with the invention, FIG. 7 is a section taken on the line VII–VII of FIG. 6, FIG. 8 is a sectional elevation, to an enlarged scale, showing a clamping mechanism for forming part of the crop store of FIGS. 6 and 7 in greater detail, FIGS. 9, 10 and 11 are elevations showing further alternative forms of crop store or silo in accordance with the invention, FIG. 12 is a scrap elevation showing an alternative arrangement for extracting fluid from the interior of a crop store or silo in accordance with the invention, FIG. 13 is an elevation showing a crop store or silo in accordance with the invention constructed partly from a synthetic plastics material, FIG. 14 is a section, to an enlarged scale, taken on the line XIV–XIV of FIG. 13, and FIG. 15 is a section, to an enlarged scale, taken on the line XV–XV of FIG. 13.

Referring to FIGS. 1 to 3 of the drawings, the crop store or silo which is illustrated has a cylindrical body 1 of circular cross section, the longitudinal axis of said body extending substantially vertically. The body 1 is formed partly from superposed rings 2 and also by an upper element 3 provided with a shallow upwardly tapering conical top. The bottom of the body 1 includes a shallow downwardly tapering frustoconical element 4 which is supported above the ground by four legs 5. A bag-shaped flexible portion 6 is located internally of the body 1 and is secured to one of the rings 2 by the mouth of the bag at a level midway between the top and the bottom of the body 1.

The length of the bag-shaped flexible portion 6 is substantially equal to the distance between the plane of its mouth (which latter is secured to the rigid wall of the body 1) and the apex of a rigid but perforated conical element 7 which is located immediately beneath the conical top of the upper element 3, the conicity of the element 7 being less pronounced than that of the top. That part of the body 1 which is located above the plane of the mouth of the portion 6 affords an envelope of rigid material which surrounds said portion 6 when the latter occupies the upwardly deflected position shown in irregularly broken lines in FIG. 1. A compressing mechanism 8 is arranged beneath the lower element 4 between two of the legs 5 and comprises an approximately vertically extending feeding channel 9 which opens at its upper end inside the body 1. A piston 10 is reciprocably arranged in the channel 9 and is driven by a connecting rod 11 whose big end is coupled to a crank mechanism 12. The crank mechanism 12 is also drivingly coupled to a compression member 14 by a connecting rod 13, the compression member 14 taking the form of a curved piston secured to a bellcrank lever turnable about a pivot located at the side of the feeding channel 9 so as to extend parallel to the axis of rotation of the crank mechanism 12. The curved piston which has just been mentioned is reciprocable in a correspondingly curved feeding channel 15 one end of which opens into the side of the straight feeding channel 9 above the piston 10 (when the latter is at bottom dead center) while the other end communicates with a feeding mechanism 16.

The feeding mechanism 16 lies between two vertical walls 17 that interconnect the lower conically curved surface of the element 4 and an upper region of the curved feeding channel 15. A number of tines 18 are movably arranged between the walls 17 in a manner which is generally known per se, the arrangement being such that, during orbital movement of a carrier of the tines about an axis extending substantially parallel to the axis of rotation of the crank mechanism 12, the tips of the tines 18 move through the approximately kidney-shaped paths 19 which can be seen in FIG. 3 of the drawings. The tips of the tines 18 move through the paths 19 in a clockwise direction as seen in FIG. 3 of the drawings so that they move crop downwardly over a curved surface of the feeding mechanism 16 towards the channel 15 during one part of their movement but are withdrawn upwardly behind strips 18A during a return part of their movement. It will be seen from FIG. 3 of the drawings that the shape of the curved surface of the mechanism 16 which has just been mentioned approximately coincides with that part of each path of movement 19 which is disposed close to said surface. A feeding device which is generally indicated by the reference 20 has its delivery end located alongside the uppermost receiving end of the feeding mechanism 16. The feeding device 20 includes a trough 21 extending between two of the legs 5, the center of the trough being formed at one side with an opening in communication with the feeding mechanism 16. Archimedean screw augers 22 are located in the trough 21 at opposite sides of the opening which has just been mentioned, said augers being wound in relatively opposite directions so that any crop which they engage is displaced lengthwise of the trough 21 into register with the central opening of the latter. The two augers 22 are mounted on a common rotary shaft 40, a member 23 which is also mounted on the shaft being located between them in register with the central opening of the trough 21. The member 23 carries a plurality of more or less radially (with respect to the shaft 40) projecting tines 23A. The delivery region of an endless elevating conveyor 24 is disposed at the side of the trough 21 remote from the feeding mechanism 16. The conveyor 24 has a width which is approximately equal to the length (parallel to the shaft 40) of the trough 21 and the lower receiving end of the elevator is supported from the ground by a frame 25. Retaining members 27 are pivotally connected to opposite sides of the interior of the feeding channel 9 in the manner which can be seen in outline in FIG. 3 of the drawings, said retaining members 27 having comblike teeth 26 that project towards the longitudinal axis of the channel 9. Small springs (not shown in the drawings) are arranged to tend to maintain the retaining members 27 in the positions shown in FIG. 3 of the drawings and it will be evident that the purpose of said retaining members is to prevent crop which has been pushed upwardly therepast by the piston 10 from moving back down the channel 9.

An electric motor 29 drives the crank mechanism 12, and thus the piston 10 and compression member 14, by way of its output shaft 30, said output shaft carrying a sprocket wheel 31 which drives a double sprocket wheel 34 by way of an endless transmission chain 32. The double sprocket wheel 34 is mounted on a shaft 33 affording the axis about which the carrier of the tines 18 orbits during operative movement of those tines. The double sprocket wheel 34 drives a sprocket wheel 36 by way of an endless transmission chain 35, said sprocket wheel 36 being secured to one end of a shaft 37 which is the upper rotary shaft of the endless elevating conveyor 24. The shaft 37 also carries a pinion 38 whose teeth are in mesh with those of a pinion 39 mounted at one end of the aforementioned shaft 40 by which the augers 22 and member 23 are carried.

A lowermost central region of the element 4 of the body 1 is provided with an outlet opening generally indicated by the reference 41. The outlet opening 41 has a downwardly directed portion 42 whose lowermost end communicates with a laterally directed portion 43 which is inclined to both the vertical and the horizontal. A vertical driving shaft 44 extends upwardly through the portion 42, said shaft being rotated by an electric motor 45 located outside the outlet opening 41 at ground level. The upper end of the driving shaft 44 carries a bevel pinion 46 whose teeth are in mesh with those of a further bevel pinion 47 mounted at the lowermost end of an upwardly inclined shaft 48 whose axis is inclined to the horizontal at the same angle as the wall of the frustoconical element 4 when the latter is seen in vertical section (FIG. 3). The shaft 48 carries the helical worm blade of an auger 49 which is located internally of the element 4. The driving shaft 44 is surrounded by a tube 50 which extends upwardly from the electric motor 45 through an opening in the wall of the portion 43 adjacent the junction thereof with the portion 42 until it reaches a gear box 51 which is rotatably connected to its uppermost end, said gear box 51 accommodating the aforementioned bevel pinions 46 and 47. The arrangement is such that the gear box 51, shaft 48 and auger 49 can turn relative to the tube 50 about the axis of the driving shaft 44.

The uppermost edge of the element 4 takes the form of an annular embossed ring 52 of hollow construction, a grating in the form of fine wire mesh, gauze or the like 53 closing the inwardly facing open side of the ring 52. A duct 54 opens into the ring 52, the end of said duct that is remote from the ring branching into two ducts 55 and 56 (FIG. 4) which communicate by way of corresponding cocks 57 with the pressure and suction sides of a double-acting pump 58 respectively. A duct 59 opens through the element 3 above the element 7 towards the apex of the former element and, adjacent the pump 58, said duct 59 branches into two ducts 60 and 61 which communicate by way of cocks 62 with the pressure and suction sides of the pump 58 respectively. A receiving region of an endless conveyor 64 may be arranged beneath the mouth of the outlet opening 41 in the manner shown in outline in the drawings. Flaps 65 and 66 are provided for closing the mouth of the outlet opening 41 and the feeding channel 9 respectively. The flap 65 is turnably connected to the mouth of the outlet opening 41 with the aid of a pivot 67, said pivot 67 carrying an arm 68 at one of its ends and the free end of said arm being pivotally connected to the piston rod of a hydraulic piston and cylinder assembly 69. The flap 66 is connected to the piston rod of a hydraulic piston and cylinder assembly 70, the two assemblies 69 and 70 being hydraulically operable to move the flaps 65 and 66 between open and closed positions with the aid of a hydraulic circuit which is not shown in detail in the drawings but which may be of a kind which is known per se. A simple pivotally mounted clamp 71 is provided to retain the flap 65 positively in the closed position shown in full lines in FIGS. 1 and 3 of the drawings. It will be noted that, when the flap 65 occupies the fully open position shown in broken lines in FIGS. 1 and 3 of the drawings, it acts as an extension of the outlet opening 41 guiding crop from the latter onto the endless conveyor 64.

In the use of the crop store or silo which has been described, crop which has been collected from afield is delivered to the receiving of the elevating conveyor 24 by a machine 72 (FIG. 1) which preferably, but not essentially, includes means for disentangling and/or chopping the crop. The elevator 24 delivers the crop to the trough 21 and the augers 22 and tines 23A contract the crop into a much narrower stream and deliver it to the feeding mechanism 16. The compressing tines 18 push the crop downwardly into the curved feeding channel 15 and the reciprocating compression member 14 pushes batches of the crop into the feeding channel 9 in advance of the piston 10. The piston 10 pushes the crop upwardly through the channel 9 past the retaining members 27 and into the body 1 of the crop store or silo. It will be evident from FIG. 3 of the drawings that the piston 10 and compression member 14 are synchronised in such a way that the curved piston of the member 14 is at top dead center in the channel 15 when the piston 10 is at bottom dead center in the channel 9 and vice versa.

The compressing mechanism which is generally indicated by the reference 8 has three consecutive compressing members, that is to say, the tines 18, the member 14 and the piston 10. After this mechanism has introduced a considerable quantity of crop into the body 1, the feeding channel 9 is closed by the flap 66 with the aid of the piston and cylinder assembly 70, the pump 58 is placed in operation and air is withdrawn from the lower region of the body 1 through the duct 54 and the ring 52. The control cocks 57 are placed in the positions shown in full lines in FIG. 4 of the drawings to achieve this. If desired, air under pressure can also be introduced into the upper region of the body 1 through the duct 59 and the control cocks 62 are also placed in the positions shown in full lines in FIG. 4 of the drawings to achieve this. The flexible portion 6 is thus brought to approximately the position shown in regularly broken lines in FIG. 1 of the drawings since said portion is made from an airtight material such as, for example, as rubber, synthetic rubber, a synthetic plastic or canvas or some other natural or synthetic textile impregnated with rubber, synthetic rubber or a synthetic plastic. The crop located beneath the flexible portion 6 is thus compressed to some extent and a large proportion of the air is withdrawn from the crop. Further filling of the body 1 necessitates higher pressures in the compressing mechanism 8 but this can be counteracted to a considerable extent by withdrawing air from the upper region of the body 1 through the duct 59 and introducing air into the lower region of the body through the duct 54. This is achieved by bringing all of the cocks 57 and 62 to the positions shown in broken lines in FIG. 4.

When the body 1 is completely filled, the flexible portion 6 will occupy approximately the upwardly directed position shown in irregularly broken lines in FIG. 1 of the drawings. Greater compression of the crop is then produced by returning the control cocks 57 and 62 to their full line positions (FIG. 4) so that air under pressure is introduced into the top of the body 1 through the duct 59 and is withdrawn from the crop itself by way of the duct 54. The crop can be brought to a highly compressed condition in this way with the removal of a large proportion of the air which would otherwise be contained therein. This is conducive to subsequent thorough fermentation of the crop.

When it is desired to withdraw fermented crop from the store or silo for use as, for example, winter fodder, the clamp 71 is released and the flap 65 is brought to its open position in which the outlet opening 41 communicates with the conveyor 64. The electric motor 45 is operated to cause the auger 49 to direct crop downwardly through the outlet opening 41 and it will be appreciated that the auger 49 and gear box 51 will tend to rotate about the axis of the driving shaft 44 so that the auger will sweep around the internal inverted frustoconical surface of the element 4. If there is any tendency for the stored crop to stick to the internal surface of the body 1 due, for example, to severe winter frost, air under pressure can be introduced above the portion 3 through the duct 59 and air can be withdrawn from the crop beneath the portion 6 by way of the duct 54. The portion 6 is thus constrained to push the crop downwardly towards the outlet opening 41.

In the embodiment illustrated in FIG. 5 of the drawings, a crop store or silo is illustrated having a cylindrical body 73 of circular cross section, the longitudinal axis of said body extending substantially vertically. The body 73 has a rigid portion afforded by rings 74 and a lowermost element 75 whose bottom is of frustoconical configuration. The element 75 is supported on the ground by legs 76. The body 73 also includes a flexible portion 77 which is formed from an airtight material such as one of those mentioned in respect of the previously described portion 6. Once again, the portion 77 is bag-shaped since it has a circular-cylindrical part and a part which extends approximately perpendicular thereto and which forms the bottom of the bag when said portion 77 occupies the position shown in full lines in FIG. 5 of the drawings. The mouth of the bag-shaped portion 77 is hermetically sealed to the upper edge of the upper ring 74 so that said mouth occupies a more or less fixed position. It will be realized that the "bottom" of the portion 77 can, on the other hand, occupy a large number of different positions only a more or less lowermost one of which is shown in FIG. 5 of the drawings. A hollow ring 78 surrounds the element 75 at approximately the level at a at which its frustoconical part joins its circular-cylindrical part, the inwardly directed open side of the ring 78 communicating with the interior of the body 73 by way of a plurality of holes 78A formed through the wall of said element 75. A duct 79 connects the ring 78 to either the pressure, or the suction, side of the double-acting pump 58 by way of a cock 80. A compressing mechanism 8 and associated parts that are similar or identical to parts that have already been described are provided for filling the crop store or silo.

An obliquely downwardly directly outlet opening 81 is provided centrally of the bottom of the element 75, said opening 81 being arranged to be closed by a slidable flap 82 with the aid of the piston and cylinder assembly 83. In this case, the shaft 48 is replaced by a similarly disposed shaft 84 to which a number of blades 85 are connected by chains at intervals along the length of the shaft 84. A downwardly inclined endless conveyor 86 has its delivery region located beneath the mouth of the outlet opening 81.

The crop store or silo which has been described with reference to FIG. 5 of the drawings does not have an envelope of rigid material around the flexible portion 77 but, after a considerable quantity of crop has been pushed into the body 73 by the compressing mechanism 8, the flap 66 may be closed and air withdrawn from a lower region of the body 73 by way of the holes 78A, the ring 78, the cock 80 and the pump 58. The flexible portion 77 will thus be drawn downwardly into compressing engagement with the crop. After the compression of this first quantity of crop, further crop can be pushed into the body 73 by the compressing mechanism 8 and this action can be assisted by connecting the duct 79 to the pressure side of the pump 58 to push the flexible portion 77 upwardly until it occupies the position which is partly shown in broken lines in FIG. 5. As soon as the body 73 is entirely filled with crop, the flap 66 is again closed and the duct 79 connected to the suction side of the pump 58. Most of the air contained in the crop is thus withdrawn therefrom. The shaft 84 and blades 85 loosen crop contained in the body 73 during a delivery operation, the loosened crop falling from the mouth of the outlet opening 81, past the opened flap 82, onto the delivery region of the conveyor 86.

FIGS. 6 to 8 of the drawings illustrate a crop store or silo having a body 87 of cylindrical configuration and circular cross section, the longitudinal axis of said body extending substantially vertically. A rigid lower portion 88 of the body has the greater part of its volume located beneath th the ground surface, three concentric tubular rings 89 to 91 being arranged on the floor of the portion 88. Each of the rings 89 to 91 is formed with a plurality of apertures and they are all connected to a duct 92 which communicates with a vacuum pump 93 located at ground level. The body 87 also includes an airtight bag-shaped flexible portion 94 whose mouth is releasably secured to the upper edge of the rigid portion 88 in a hermetically sealing manner. The portion 94 is similar to the previously described portions 6 and 77.

The upper edge of the portion 88, which may be formed from concrete or the like, is provided with a metal rim 95 to a radially outer edge region of which supports 96 are secured at regular intervals around said rim. The supports 96 project upwardly, and inwardly towards the longitudinal axis of the body 87, and their upper free ends have levers 97 turnably connected to them with the aid of horizontal pivots 99. Each lever 97 rotatably supports a corresponding roller 98 but the axis of rotation of said roller is spaced from the corresponding pivot 99. When the flexible portion 94 is to be secured to the rim 95, its mouth is laid upon the metal rim 95 and a metal ring 100 is laid over said mouth in the manner which can be seen in FIG. 8 of the drawings so that the mouth is sandwiched between the rim 95 and the ring 100. The levers 97 are then turned upwardly about the pivots 99 to press the ring 100 firmly towards firmly towards the rim 95 with consequent compression of the flexible material of the portion 94. When each lever 97 reaches the position shown in FIG. 8 of the drawings, a stop 101 carried thereby comes into contact with the corresponding support 96 at which time the axis of rotation of the roller 98 will have just passed through a vertical plane containing the pivot 99. Thus, the tendency of the material of the portion 94 to regain its uncompressed configuration maintains the various levers 97 and rollers 98 in the operative positions which are illustrated in the drawings.

The rigid portion 88 of the crop store or silo is first filled with crop from wagons or other vehicles located at ground level (see FIG. 6 of the drawings), the flexible portion 94 being disconnected from the rigid portion 88 at this time. When crop is piled up in the rigid portion 88 well above the level of its rim 95, the flexible portion 94 can be arranged thereover in the manner of a cover and hermetically clamped to the rim 95 as previously described. The pump 93 may then be operated to extract air from the crop and draw the flexible portion 94 downwardly into approximately the position illustrated in broken lines in FIG. 6. The flexible portion 94 can subsequently be removed and further crop added until the body 87 is completely filled at which time the flexible portion 94 will occupy more or less the position shown in full lines in FIG. 6. The vacuum pump 93 is operated as required to compress the crop and extract a large proportion of the air therefrom. Stored crop is extracted from the body 87 merely by unclamping the flexible portion 94 to obtain direct access to the interior of said body.

The crop store or silo illustrated in FIG. 9 of the drawings has a body 102 of cylindrical configuration and circular cross section, the longitudinal axis of the body extending substantially vertically. As can be seen in the drawings, the crop store or silo has its base located center a lower lever than that of a delivery terrace or the like disposed to one side thereof. The body 102 includes a lower rigid portion 103 whose bottom is of downwardly tapering shallow frustoconical configuration and also a flexible portion 111 whose formation and method of releasable connection to the uppermost edge of the rigid portion 103 may be the same as in the case of the flexible portion 94 described with reference to FIGS. 6 to 8 of the drawings. The rigid portion 103 of the body 102 is supported on the ground by legs 104 and the centre of its inverted frustoconical bottom is formed with an obliquely downwardly directed outlet opening 105 the mouth of which is closed by a pivotable flap 106. A hollow ring 107, holes 108 and a duct 109 are provided that correspond to the previously described parts 78, 78A and 79 respectively, the duct 109 leading by way of an on/off cock to a vacuum pump 110.

The crop store or silo is filled from the level of the terrace or other elevation in the same way as has been described with reference to FIGS. 6 to 8 of the drawings, the vacuum pump 110 and flexible portion 111 being employed to compress the crop and extract most of the air therefrom. Delivery of stored crop onto the conveyor belt 64 is achieved by opening the flap 106 and driving a shaft (not visible) located inside a tube 113 with the aid of an electric motor 114. The driving shaft which has just been mentioned has its upper end located in a gear box 115A and carries a bevel pinion arranged to drive a further relatively inclined bevel pinion mounted rotatably on a small frame which is not visible in the drawings. The frame is surrounded by a saw-toothed belt 112 the plane of which is inclined to the horizontal at approximately the same angle as the frustoconical wall of the bottom of the portion 103 when said wall is viewed in vertical section (see FIG. 9). The toothed belt 112 rotates about a center located close to, and a center remote from, the axis of the tube 113 and the whole of the belt 112, the frame upon which it is mounted and the gear box 115A can also rotate about the substantially vertical axis of the tube 113 and the driving shaft located inside the latter. The two axes of rotation of the belt 112 extend substantially perpendicular to the frustoconical wall of the portion 103 which they are located alongside. It will be noted that, in this case, it is not necessary to remove the flexible portion 111 to withdraw crop from the body 102 and that such withdrawal can be assisted by sucking air from beneath the portion 11 with the aid of the vacuum pump 110.

FIG. 10 illustrates a crop store or silo having a body 115 which is substantially identical in construction to the body 87 illustrated in FIG. 6 of the drawings. However, in this case, the rigid portion 88 of the body 115 has only a minor portion of its height buried beneath ground level and a duct 116 which interconnects the vacuum pump 93 and the tubular rings 89 to 91 passes through the rigid wall of the portion 88 above ground level in contradistinction to the arrangement of FIG. 6 in which the duct 92 passes through the wall of the rigid portion 88 beneath ground lever and immediately above the floor of said portion 88. The flexible bag-shaped portion 94 is shown in FIG. 10 of the drawings as occupying a position in which it has been drawn downwardly into compressing engagement with the crop by the action of the vacuum pump 93. The mouth of the flexible portion 94 is clamped to the rim of the rigid portion 88 in exactly the same way as has been described with reference to FIG. 6.

FIG. 11 of the drawings illustrates an embodiment which is similar in many respects to that of FIG. 1 and parts that are similar, or identical, to parts that have already been described with reference to preceding FIGS. are designated in FIG. 11 by the same references as are used in the former FIGS. of drawings. The crop store or silo has a body 117 but the flexible portion 6 of that body is provided with a flexible hose 118 whose uppermost end communicates with a duct 119 that passes through the top of the body and downwardly at one side thereof to the level of the bottom of the body. A pipe branch 120 located at the level which has just been mentioned leads by way of a tap 123 to a suction pump 121 whose outlet or delivery side takes the form of a drain pipe 122. The duct 119 continues beneath the pipe branch 120 and is connected by a tap 124 to a water main or other source of water under pressure. The outlet opening 41 of the body 117 is provided with a sildable closure flap 125 arranged to be moved into and out of its closing position by a hydraulic piston and cylinder assembly 126.

Crop is introduced into the interior of the body 117 by the compressing mechanism 8 in the same way as has been described with reference to FIGS. 1 to 3 of the drawings but, in this case, an incompressible fluid (water) is introduced into the upper region of the body 117, above the flexible portion 6, by the duct 119 and hose 118. The tap 123 is closed and the tap 124 is opened to effect this. When it is desired to withdraw the water from above the flexible portion 6, the tap 124 is closed, the tap 123 opened and the suction pump 121 is operated. FIG. 12 of the drawings shows an alternative arrangement in which the suction pump 121 is dispensed with, the tap 123 in the branch pipe 120 being opened after closure of the tap 124 to connect the column of water in the duct 119 direct to a drain. The well-known syphon effect than causes the water to be withdrawn from above the flexible portion 6 without the use of a pump. The flexible portion 6 is shown in FIG. 11 of the drawings occupying a position in which it is extended downwardly approximately as far as it will go, the space thereabove being filled with water. Delivery of stored crop from the body 117 is carried out in substantially the same manner as previously described with reference to FIGS. 1 to 3 of the drawings.

FIGS. 13 to 15 of the drawings illustrate a crop store or silo diagrammatically with the omission of the parts employed for introducing crop into, and withdrawing crop from, the interior of its body 127. Nevertheless, it is to be understood that the crop store or silo of FIGS. 13 to 15 generally corresponds to either the embodiment shown in FIG. 1 or that shown in FIG. 11 of the drawings. The body 127 comprises a plurality of superposed rings 128 each of which is formed from a synthetic resin or other synthetic plastics material. The body has a conical upper element 129 and an inverted frustoconical lower element 130 provided centrally with an outlet opening 131 which is shown only diagrammatically. The elements 129 and 130 may, if desired, also be formed from a synthetic resin or other synthetic plastics material. The rings 128 are formed from four segments each segment having vertically-extending bent over rims 132 and horizontally-extending bent-over rims 134. As can be seen in FIGS. 14 and 15 of the drawings, the rims 132 are secured to one another to form the rings 128 by bolts 133 and the superposed rings are secured to one another by further bolts 133, said bolts being entered through alined holes formed in pairs of the rims 132 and pairs of the rims 134 respectively. In order to effect an airtight construction of the body 127, it is greatly preferred to employ a sealing adhesive between the rims 132 and the rims 134 in addition to the bolts 133. The elements 129 and 130 are formed with rims which are secured to the upper and lower rings 128 respectively in a similar manner.

The use of a synthetic resin or other synthetic plastics material to form the rigid portion of the body 127 of the crop store or silo illustrated in FIGS. 13 to 15 of the drawings has the advantage that the synthetic material is unaffected by acids and other products of fermentation of crop contained within the body. The desirability of employing expensive corrosion-free metals or expensive corrosion-inhibiting techniques is thus avoided. The body of each of the various crop stores or silos which have been described preferably has a diameter of between 2.0 and 3.0 metres.

I claim:

1. A crop store comprising a body structure, the lower portion of said body structure being rigid, an airtight, baglike flexible element being provided having a length which is about half the length of the said lower portion, the mouth of said baglike portion being connected to said lower portion whereby the bottom of said baglike element is displaceable to either side of said mouth and pump means is associated with said store for withdrawing air from said lower portion and supplying air under pressure to said lower portion.

2. The crop store of claim 1, wherein the wall of said lower portion has a rim and a plurality of quickly releasable connections are mounted adjacent said rim for releasably securing said flexible element to said rim.

3. The crop store claimed in claim 2, wherein said quickly releasable connections are each comprises of a lever pivotably mounted on said rim and a roller movable by said lever to clamp the mouth of said flexible baglike element against said rim.

4. The crop store claimed in claim 1, wherein said flexible baglike element is contained within a rigid structure connected to the lower portion of said crop store.

5. The crop store claimed in claim 1, wherein at least one opening is provided adjacent the bottom of said crop store for the introduction and withdrawal of air.

6. The crop store claimed in claim 5, wherein said structure is generally cylindrical and the openings at the bottom of said store are distributed all around the axis of said body.

7. The crop store claimed in claim 6, wherein a hollow ring surrounds said structure and said ring has an open side facing inwardly of said store, said open side being covered by mesh.

8. The crop store claimed in claim 1, wherein at least one opening is provided in the top of said crop store for the introduction and withdrawal of a fluid.

9. The crop store claimed in claim 1, wherein a pump is in communication with each side of said flexible baglike element.

10. The crop store claimed in claim 9, wherein said pump is part of a pneumatic fluid system provided with controls, the pressure side of said pump and the suction side of said pump each being connectable to both the top and bottom of said store.

11. The crop store claimed in claim 10, wherein a plurality of openings are provided adjacent the bottom of said crop store.

12. The crop store as claimed in claim 11, wherein said openings are formed in tubular ring means located adjacent the bottom of said store.

13. The crop store claimed in claim 12, wherein a plurality of concentrically arranged tubular rings are provided in said tubular ring means and said rings are connected to a common outlet duct.

14. The crop store claimed in claim 9, wherein fluid can be supplied to one side of said flexible baglike element opposite to the other side where crop is disposed.

15. The crop store claimed in claim 14, wherein a hose for the supply of fluid is in communication with said flexible baglike element on side opposite from where crop is disposed.

16. The crop store claimed in claim 15, wherein said fluid is water and syphon means is provided to enable the water to be withdrawn from said crop store.

17. A crop store comprising a body structure, said body structure being rigid, at least in part, and an airtight flexible element being connected to the rigid portion of said store, a compressing mechanism for introducing crop into said crop store communicating with the bottom of said store by way of a feeding channel, said mechanism comprising three consecutive members that perform pushing and compressing actions during use.

18. The crop store claimed in claim 17, wherein said feeding channel extends substantially vertically and opens into said crop store approximately centrally of its bottom.